United States Patent [19]

Winter et al.

[11] 4,394,473

[45] Jul. 19, 1983

[54] RUBBER COMPOUNDING BAGS AND FILM MADE FROM SYNDIOTACTIC 1,2-POLYBUTADIENE

[75] Inventors: John P. Winter; Mladomir Tomic, both of Appleton, Wis.

[73] Assignee: The Coca-Cola Company, Atlanta, Ga.

[21] Appl. No.: 309,046

[22] Filed: Oct. 6, 1981

[51] Int. Cl.³ ................... B65D 25/08; C08F 36/00
[52] U.S. Cl. ................... 524/226; 206/219; 206/524.6; 206/524.7; 428/35; 524/526; 524/571; 524/313; 524/284; 524/394; 524/399; 524/435; 524/441; 524/445; 524/449; 524/451; 525/237; 526/335
[58] Field of Search ................... 526/335; 525/237; 428/35; 206/447, 219, 524.6, 524.7; 524/226, 526, 571

[56] References Cited

U.S. PATENT DOCUMENTS

| | | | |
|---|---|---|---|
| 3,137,683 | 6/1964 | Natta et al. | 260/94.2 |
| 3,522,332 | 7/1970 | Ichikawa et al. | 260/94.3 |
| 4,110,500 | 8/1978 | Evans et al. | 428/215 |
| 4,112,158 | 9/1978 | Creekmore et al. | 428/35 |
| 4,248,348 | 2/1981 | Butler et al. | 428/35 |
| 4,334,615 | 6/1982 | Butler et al. | 206/447 |

*Primary Examiner*—William R. Dixon, Jr.
*Attorney, Agent, or Firm*—Birch, Stewart, Kolasch and Birch

[57] ABSTRACT

Bales of unvulcanized rubber, vulcanized rubber or compounding ingredients for unvulcanized rubber are packaged in film or bags made from syndiotactic 1,2-polybutadiene (1,2-SBD) containing at least one antiblock agent additive and at least one slip agent additive. Coextrusion can be used to manufacture bags or film having two or more layers where only the inside layer is heavily loaded with antiblock additives and the outside layer contains only a minimal amount of antiblock additives with both layers containing slip agents. The use of 1,2-SBD serves to eliminate the problems of incompatibility and disposal encountered in the prior art and provides film and bags having superior puncture and tear resistance when compared to a conventional material such as polyethylene.

42 Claims, No Drawings

RUBBER COMPOUNDING BAGS AND FILM MADE FROM SYNDIOTACTIC 1,2-POLYBUTADIENE

FIELD OF THE INVENTION

This invention relates to packages and bags for rubber compounding ingredients and for unvulcanized rubber.

BACKGROUND OF THE INVENTION

Compounding ingredients for rubber can be conveniently packaged in bags made from thermoplastic polymers or paper while bales of unvulcanized rubber are often packaged by wrapping them with paper or with thermoplastic film, the latter being conventionally known as bale wrap. Polyethylene is usually used for these purposes because of its plasticity and antiblock properties and because it can be obtained at a relatively low cost. Indeed, polyethylene is the most widely used polymer for the manufacture of plastic films with over 4.4 billion pounds of film having been manufactured in the United States in 1979. A good portion of this film was used as shipping sacks, packaging films, pallet stretch wrap and shrink wrap.

However, the use of polyethylene, as well as some other thermoplastics, for rubber compounding bags or for bale wrap is not truly acceptable because of the incompatability of such thermoplastic materials with rubber compounds. The relatively high melting temperature and the fact that polyethylene is not crosslinkable by conventional curing mediums can lead to severe defects in rubber compounds when polyethylene is incorporated in the mix. Another significant disadvantage of the use of polyethylene is that it does not disperse sufficiently in the matrix when it is mixed with unvulcanized rubber. This leaves minute areas within the matrix of the rubber when cured, which are themselves not cured and are subject to degradation.

Thus, polyethylene, when incorporated into a compounding formulation through the use of compounding bags, bale wrap or shipping sacks, can be the source of several problems leading to potential batch or product rejects. The use of polyethylene for mixes where the drop temperatures are too low (ca. 250° F.) for standard film grade polyethylene to adequately melt or disperse is of particular concern. The result is a defective tire, hose, belt, gasket or whatever rubber product is being manufactured.

One example of such a problem would be the buildup of gases at the undispersed polyethylene site in a tire which could lead to ply or tread separation. Another example of such problems is in connection with steam hoses where polyethylene voids can lead to blisters in the finished product. Polyethylene voids are also of concern in finished products such as belts and gaskets. In cases where compounding temperatures are high enough to melt and disperse the polyethylene, the polyethylene acts as a phase- changing, poorly compatible oil or liquid.

Various materials have been proposed as a substitute for polyethylene in such utilities, as disclosed, for example, in U.S. Pat. Nos. 4,110,500; 4,112,158; and 4,248,348 as a result of the industry's attempt to find an acceptable packaging material.

SUMMARY OF THE INVENTION

The present invention provides a significant and beneficial improvement in the relevant art. In accordance with this invention, it has been found that the aforementioned disadvantages can be minimized or eliminated by the use of syndiotactic 1,2-polybutadiene (1,2-SBD) containing at least one antiblock agent additive and also containing at least one slip agent additive as a packaging material for rubber compounding ingredients or unvulcanized rubber. The 1,2-SBD polymer is reactive, has a low melting temperature and, in addition, is compatible with rubber compounds. Its low melting temperature (<180° F.) insures fluxing into the rubber compound mix and its molecular structure permits crosslinking with sulfur or peroxide curing mediums, therefore permitting it to become an integral part of the resulting compound.

In addition, the 1,2-SBD packaging material can be used to package partially vulcanized rubber, vulcanized rubber and even plastic (polymeric) materials such as polystyrene.

COMPOUNDING BAGS

Thus, one of the most beneficial applications for 1,2-SBD film is for use as compounding bags. In particular, this unique film is ideally suited as a remote weighing bag for materials such as sulfur, primary and secondary accelerators, stearic acid, zinc oxide, plasticizers and oils, and other materials added to the internal mixers in small quantities.

The remote weighing system using 1,2-SBD compounding bags can consist of a simple manual set-up where a worker pre-weighs batches of specific components, or it could be as elaborate as an automatic form, fill and seal operation. In either case, the result is pre-weighed, packaged components which can be introduced to the internal mixer.

Remote weighing is currently in use by many compounders utilizing polyethylene bags. However, in many cases the introduction of the polyethylene bag into the compound can lead to the problems discussed above. Using bags made from 1,2-SBD eliminates these potential problems. In addition, 1,2-SBD bags have the potential of holding oil-extended fillers and liquid chemicals, which in many cases is not possible with polyethylene bags.

Remote weighing with 1,2-SBD bags has many advantages over the "scoop and shovel" method of Banbury additions: i.e., (1) housekeeping; (2) industrial hygiene; (3) loss control; (4) accuracy and quality control; and (5) labor savings plus the all important new advantages of compatibility with standard elastomers and the unique feature of network cross- linking. All of the above occur while enjoying the safety afforded in handling and processing resulting from the very high tear and puncture properties inherent in the film. These features will fulfill the rubber market needs for a material that will allow the use of compounding bags to a much larger extent than is currently employed.

BALE WRAPS

Manufacturers of raw polymer have invested in equipment for wrapping hot polymer bales with perforated polyethylene film. Perforation is necessary to allow absolute conformation to bale contours. The polyethylene wrap replaces kraft or polyethylene bags for packaging the bales. The polyethylene bale wrap is not easily stripped off so that the polyethylene ends up in the compound, which could lead to potential incompatibility problems. Some compounders insist on bales being packaged in expensive multiwall kraft bags to eliminate the incompatibility problem associated with polyethylene wrap. The utilization of perforated 1,2-SBD bale wrap, or the use of a 1,2-SBD bag in the case where the raw polymer manufacturer does not utilize automatic bale wrappers, eliminates both incompatibility and kraft bag disposal problems, the latter of which has become an increasingly unwieldy matter.

SHIPPING SACKS AND DRUM LINERS

Kraft and polyethylene shipping sacks are currently used extensively for compounding ingredients such as clays, carbon black, silicas, ground reclaim and other miscellaneous chemicals and fillers. The polyethylene bags are sometimes introduced into the Banbury with the contents. This again leads to a potential incompatibility problem.

In the cases where this is not done or where kraft bags are utilized, the bags must be disposed of. These disposal problems have been aggravated by a recent EPA ruling that empty bags which contain materials classified as hazardous substances are themselves classified as hazardous substances. Utilization of 1,2-SBD shipping sacks eliminates incompatibility and bag disposal problems and also eliminates the excessive cost associated with disposal.

Drum liners, whether used by the raw material supplier or the compounder, are another application for 1,2-SBD. A particular example is the containment of pastes where a polyethylene drum liner is used and the paste is scraped out of the drum. Utilization of a 1,2-SBD bag or liner would enable the material to be introduced into the Banbury with the liner or bag.

Thus, the primary object of this invention is to eliminate the incompatibility and disposal problems encountered by rubber compounders when utilizing polyethylene or paper as packaging materials for rubber compounding ingredients or unvulcanized rubber, as well as to provide film or bags having superior puncture and tear resistance when compared to such conventional materials. That is, bags or film manufactured from syndiotactic 1,2-polybutadiene have the following specific advantages over comparable bags made from low density polyethylene or other thermoplastics such as ethylene-vinyl acetate copolymer:

(1) The low melting temperature of 1,2-SBD insures that the film will completely melt and disperse in the rubber compound.

(2) The molecular structure of 1,2-SBD permits crosslinking with sulfur or peroxide curing mediums and, therefore, the material becomes an integral part of the resulting compound.

(3) Films of 1,2-SBD have superior puncture and tear resistance.

These and other objects and advantages of the present invention will become apparent to those skilled in the art from a consideration of the following specification and claims.

DETAILED DESCRIPTION OF THE INVENTION

The package of this invention comprises (A) an article selected from at least one of unvulcanized rubber or compounding ingredients for unvulcanized rubber packaged in (B) a bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof. The thickness of the bag or film is in the range of about 0.5 to about 10 mils, preferably about 1 to 3 mils.

It is important to note that aniblock and slip agents are employed with the 1,2-SBD in manufacturing bags or film in accordance with the present invention. Film or bags made from 1,2-SBD per se will block (stick) together. This is a particular problem when attempting to manufacture bags as it is virtually impossible to subsequently open the bags for filling. In addition, the tacky nature of 1,2-SBD film itself results in problems in film handling such as on bagmaking and winding equipment. The slip additives reduce the coefficient of friction of the film by coating the surface. Antiblock additives roughen the film surface to prevent two layers from sticking or blocking together.

Generally, the antiblock additives to be employed in this invention are inorganic minerals or salts, and the slip additives are organic agents. A wide variety of either can be used. Exemplary antiblock additives to be employed include diatomaceous earths, talcs, amorphous and fumed silicas, inorganic metal salts such as calcium carbonate and calcium sulfate, polyoxyethylene fatty alcohols, wollastonites, glass particles, perlites, mica, titanates, hydrated alumina, various forms of carbon, fluoroplastics, polyvinyl alcohols, polysiloxanes, clays and silicates such as aluminum silicate and sodium aluminum silicate. Exemplary slip agents include fatty acids and metal salts thereof such as behenic acid, stearic acid, arachidic acid and zinc stearate, fatty acid amides such as oleamide, erucamide, stearamide and ethylene bisoleamide, ester waxes and partly saponified ester waxes.

It is, however, important to minimize the amount of additives used as they decrease the strength and increase the cost of the finished product. Thus, most preferably, it has been found that bags made by means of a single layer extrusion containing either about 3 to 7% by weight of diatomaceous earth or about 4 to 6% by weight of talc as the antiblock and about 1 to 2% by weight of a blend of erucamide and stearamide, advantageously in approximately equal amounts (ranging from about 40–60 to 60–40%), have excellent openability and surface properties.

Moreover, it has been found that in the manufacture of bags, it is not necessary to load the entire film thickness with high levels of antiblock additives, both from the point of view of economics and also the strength of the bag itself. Since the antiblocking function is most critical to provide bag openability, it is only necessary to heavily load the inside surface of the film. Thus, in another embodiment of this invention, a bag or film can be made by coextrusion in which a film having two or more layers can be provided with only the inside layer heavily loaded with antiblock additives, and the outside layer containing only a minimal amount of antiblock additives, with both layers containing slip agents to allow the film to slide through equipment and to prevent adjacent bags from sticking together. In this embodiment, the coextruded bag or film comprises at least an inside layer and an outside layer, said inside layer being made of syndiotactic 1,2-polybutadiene containing a greater amount of one or more of said antiblock agents than the outside layer. The inside layer of the coextruded bag or film contains about 3 to 8%, preferably about 4 to 7%, by weight of antiblock agent and about 0.5 to 3%, preferably about 1 to 2%, by weight of slip agent. The outside layer thereof contains about 0.5 to 3%, preferably about 1 to 2%, by weight of slip agent and about 1 to 4%, preferably about 1 to 3%, by weight of antiblock agent. The inside and outside layers are integrally and intimately bonded together by the heat and pressure of the coextrusion process. Such coextruded films or bags can be made by blown or cast extrusion, although blown extrusion is preferred.

A preferred embodiment of this nature comprises a coextruded film with the inside layer constituting about 10–40% (by weight) of the total structure with the inside layer containing about 5 to 7% by weight of diatomaceous earth or about 4 to 6% by weight of talc as the antiblock agent and about 1 to 2% by weight of an approximately equal blend of erucamide and stearamide as the slip agent. The outer layer, comprising about 60–90% (by weight) of the total structure, contains about 1 to 3% by weight of diatomaceous earth or talc as the antiblock agent and about 1 to 2% by weight of an approximately equal blend of erucamide and stearamide as the slip agent.

The coextruded structure provides an improvement over the single layer structure in that it contains less additives and thus provides a stronger and less expensive film in the overall composite.

As noted above, one of the primary advantages of the use of 1,2-SBD in making rubber compounding bags and film in accordance with this invention is its molecular structure which permits crosslinking with sulfur or peroxide curing mediums. Crosslinking or vulcanization (curing) is a common procedure in the manufacture of rubber products. In the majority of crosslinking reactions, sulfur, heat and/or catalysts are used to produce sulfur bonds between two carbon atoms. A typical crosslinking reaction for natural rubber using sulfur and forming a monosulfidic bond is as follows:

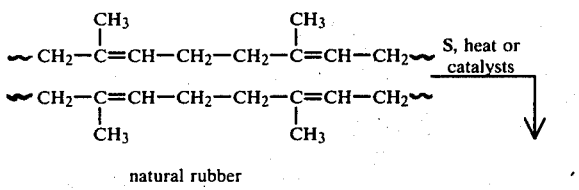

natural rubber

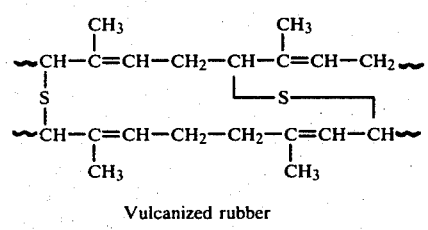

Vulcanized rubber

The double bonds of the vinyl groups in natural rubber are extremely important as they provide the allylic hydrogens which permit the crosslinking. It is to be noted that natural rubber has a moderate degree of unsaturation with one double bond for every five carbon atoms and is, therefore, easily crosslinked.

The crosslinking reaction of 1,2-SBD is as follows:

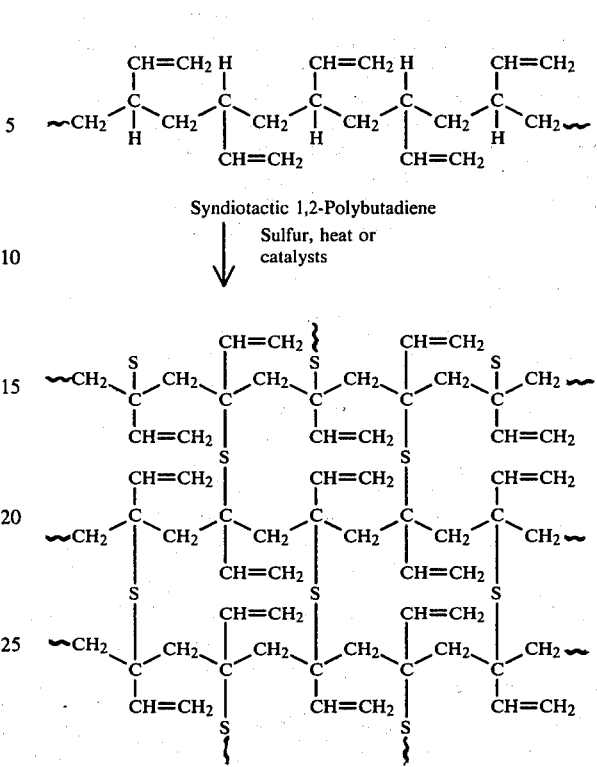

It is to be noted that 1,2-SBD has a vinyl group and a hydrogen bonded to a tertiary carbon at the allyl position in each structural unit. This results in a very high degree of unsaturation with a pendant active double bond at every other carbon atom. This high degree of unsaturation and high degree of reactivity as exhibited by the number of tertiary hydrogens makes 1,2-SBD easily crosslinkable through well known sulfur mechanisms. In fact, 1,2-SBD is more easily crosslinked than many synthetic rubbers such as butyl rubber. Butyl rubber is a copolymer containing one isoprene unit copolymerized with 98 isobutyl groups resulting in one double bond for every 401 carbon atoms. Since the double bonds are the critical controlling factor for crosslinking, butyl rubber would be more difficult to crosslink than 1,2-SBD.

The molecular structure for polyethylene is as follows:

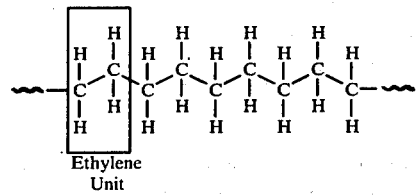

Ethylene Unit

Polyethylene contains no double bonds and, therefore, cannot be crosslinked by conventional means such as with sulfur, heat and/or catalysts. In order to crosslink polyethylene, it is necessary to use strong peroxides and high temperatures, or irradiation with electron beam or gamma rays. This inability for polyethylene to be easily crosslinked makes it incompatible when incorporated within a rubber compound mix.

Thus, in the practice of this invention, a method of compounding rubber is provided and the resulting compounded rubber, which comprises mixing unvulcanized rubber, for example, high unsaturation rubber, with the package of this invention containing conventional rubber compounding ingredients optionally followed by curing the prepared mixture of rubber, packaging film and packaged ingredients. The invention is also useful where the compounding ingredients include a rubber processing oil.

In the further practice of this invention a packaged unvulcanized rubber, such as a packaged unvulcanized rubber for storage, comprises such unvulcanized rubber substantially encompassed with a wrap or bag of the 1,2-SBD film. The film is generally applied around the unvulcanized rubber, especially when in bale form, usually under some tension so that it more firmly wraps the rubber and is then heat sealed against itself to complete the package.

Various rubber compounding ingredients can be packaged according to this invention and then compounded with unvulcanized rubber. Representative of such well known compounding ingredients are fillers, such as clay, silicates, calcium carbonate and the like; accelerators, such as, for example, cadmium diethyldithiocarbamate, tetramethylthiuram disulfide, benzothiazyl disulfide and the like; antioxidants, such as the well-known substituted thioesters and amine types, antiozonants, such as aniline derivatives, diamines and thioureas; curatives such as sulfur, sulfur providing compounds and peroxides; ultraviolet agents such as substituted benzotriazoles and substituted benzophenones; colorant pigments, such as iron oxide, titanium dioxides and organic dyes; reinforcing pigments, such as carbon black, zinc oxide and hydrated silicon compounds; and processing aids, such as silicon dioxide, pumice, stearates and rubber processing oils.

In this manner, the term "packaged" relates to both bagged or wrapped compounding ingredients, and also to mixtures thereof with rubber processing oil. Such compounding ingredients, even when containing the rubber processing oil, do not necessarily have to be free flowing in order to be used in the processing of rubber when using the 1,2-SBD bags or film of this invention. Furthermore, such "packages" include the packaging of unvulcanized rubber, usually as bales of rubber.

Representative of the various unvulcanized rubbers which can be packaged or which can be mixed with packaged compounding ingredients therefor are natural rubber, synthetic cis-1,4-polyisoprene, polybutadiene rubbery butadiene/styrene copolymers and rubbery butadiene/acrylonitrile copolymers. These rubbers are of the high unsaturation type. Namely, they contain an appreciable amount of carbon-to-carbon double bonds therein. However, this invention can also be employed for the packaging of unvulcanized rubbers of the low unsaturation type. Representative of such low unsaturation rubbers are butyl rubber, which is typically a copolymer containing a major amount of isobutylene and a minor amount of isoprene, as well as the various ethylene/propylene copolymers (EPM rubber) and rubbery terpolymers of ethylene/propylene and a minor amount of a non-conjugated diene (EPDM rubber).

EXAMPLES OF THE INVENTION

The following Examples are given merely as illustrative of the present invention and are not to be considered as limiting. Unless otherwise noted, the percentages therein and throughout the application are by weight.

EXAMPLE 1

Pellets of syndiotactic 1,2-polybutadiene together with 6.9% diatomaceous earth and 1.6% of a 50:50 blend of erucamide and stearamide were fed into a conventional plasticizing extruder, extruded through a blown film die at a melt temperature of 350° F. and backpressure of 4000 psi and cooled to form a film tube having an average thickness of 1.0 mil. The film tube was subsequently converted into bags on conventional bag-making machinery by heat-sealing and perforating and then packaged in roll form.

The resulting bags were then subjected to the tests outlined in Table 1 to determine their physical and thermal properties. A comparison with a conventional low density polyethylene bag is also shown in Table 1, indicating the superior properties of bags manufactured from 1,2-SBD.

TABLE 1

| | Elmendorf Tear[2] | | Ultimate Elongation[3] | | Falling Dart Impact Strength[4] | Melting Point Tm (DSC Method)[5] |
|---|---|---|---|---|---|---|
| | MD* | TD** | MD* | TD* | | |
| 1,2-SBD[1] (1.0 mil bag) | 200 g | 581 g | 426% | 583% | 158 g | 176° F. |
| Low density PE (1.0 mil bag) | 76 g | 234 g | 261% | 389% | <40 g | 241° F. |

[1]25% crystallinity film grade resin
[2]ASTM D1922
[3]ASTM D882
[4]ASTM D1709
[5]Differential Scanning Calorimeter
*Machine Direction
**Transverse Direction

EXAMPLE 2

A first mixture comprising pellets of syndiotactic 1,2-polybutadiene together with 6.9% diatomaceous earth and 1.6% of a 50:50 blend of erucamide and stearamide was fed into a first plasticizing extruder and extruded through the inside layer of a two layer blown film die at a melt temperature of 350° F. and backpressure of 4000 psi. A second mixture of pellets of syndiotactic 1,2-polybutadiene together with 2% diatomaceous earth and 1.5% of a 50:50 blend of erucamide and stearamide was fed into a second plasticizing extruder and extruded through the outside layer of the same two layer blown film die.

The resulting two layer extrudate was subsequently cooled to form a composite film having an average thickness of 1.5 mils and converted into bags on conventional bag-making machinery by heat-sealing and perforating and then packaged in roll form. The output of each extruder was adjusted to yield a composite film consisting of 33.3% inner layer and 66.7% outer layer material.

The resulting composite contained a combined total of 4.3% diatomaceous earth and 1.55% of a 50:50 blend of erucamide and stearamide. This is in contrast to the single layer film of Example 1 containing 6.9% diatomaceous earth and 1.6% of a 50:50 blend of erucamide and stearamide.

The physical and thermal properties of the two layer composite bag are shown in Table 2. These data show that the physical properties of the composite bag are improved over those of a 1.5 mil single layer bag made according to the procedure of Example 1 by reducing the total amount of diatomaceous earth through coextrusion.

TABLE 2

| | Elmendorf Tear[1] | | Ultimate Tensile Strength[2] | | Ultimate Elongation[2] | | Falling Dart Impact Strength[3] |
|---|---|---|---|---|---|---|---|
| | MD | TD | MD | TD | MD | TD | |
| 1.5 mil coextruded 1,2-SBD bag | 1200 g | 506 g | 3200 psi | 2200 psi | 480% | 650% | 202 g |
| 1.5 mil 1,2-SBD single layer bag | 253 | 707 | 2800 | 2100 | 430% | 620% | 203 g |

[1]ASTM D1922
[2]ASTM D882
[3]ASTM D1709

EXAMPLE 3

In order to illustrate the facile crosslinkability of 1,2-SBD, experiments have been conducted by others in the prior art with various rubber compounding formulations which include 100% 1,2-SBD, 100% EPT (ethylene-propylene-diene terpolymer) or a 50—50 blend of these two elastomers as a part of the mix. In some of these experiments, the rubber compounding formulations were compounded and cured by charging the formulations into a Banbury mixer and subsequently milling and press curing at 160° C. for 10 minutes.

The components of the formulations employed in these tests are shown in Table 3. The physical properties of the resulting compounds after curing are also shown in Table 3, together with typical physical properties of uncured 1,2-SBD. The change in physical properties between the uncured and cured SBD polymer serves to confirm that this material does indeed easily crosslink.

TABLE 3

RELATION BETWEEN 1,2-SBD/EPT[1]
BLEND RATIO AND CORRESPONDING PROPERTIES
COMPOUNDING FORMULATIONS (in parts by weight)

| Formulation | 100% 1,2-SBD | 100% EPT | 50/50 1,2-SBD/EPT |
|---|---|---|---|
| 1,2-SBD | 100 | 0 | 50 |
| EPT | 0 | 100 | 50 |
| ZnO #3 | 5 | 5 | 5 |
| Stearic Acid | 1 | 1 | 1 |
| HAF Carbon | 50 | 50 | 50 |
| SRF Carbon | 50 | 50 | 50 |
| Naphthenic Oil | 35 | 35 | 35 |
| Amberol ST 149[2] | 3 | 3 | 3 |
| Accelerator CZ[3] | 2 | 2 | .2 |
| Accelerator TT[4] | 0.5 | 0.5 | 0.5 |
| Accelerator DT[5] | 1 | 1 | 1 |
| Sulfur | 1.5 | 1.5 | 1.5 |
| Total | 249 | 249 | 249 |

[1]Ethylene Propylene Terpolymer (EPDM rubber with unsaturated third monomer)
[2]Tackifier (Rohm & Haas)
[3]Cyclohexyl Benzothiazole Sulfenamide
[4]Tetramethyl Thiuram Disulfide
[5]Di-O-Tolylguanidine

PHYSICAL PROPERTIES
CURING CONDITIONS: PRESS CURE; 160° C.; 10 MINUTES

| Formulation | Uncured 100% 1,2-SBD | Cured 100% 1,2-SBD | Cured 100% EPT | Cured 50/50 Blend |
|---|---|---|---|---|
| 100% Modulus (kg/cm²) | — | 102 | 40 | 68 |
| 300% Modulus (kg/cm²) | 60 | 141 | — | — |
| Tensile Strength (kg/cm²) | 105 | 148 | 128 | 127 |
| Elongation (%) | 700 | 280 | 350 | 270 |
| Hardness (JIS A) | 89 | 93 | 77 | 90 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A package which comprises (A) an article selected from at least one of unvulcanized or vulcanized rubber or compounding ingredients for unvulcanized rubber packaged in (B) a bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the thickness of said bag or film being in the range of about 0.5 to about 10 mils.

2. The package of claim 1, wherein the antiblock agent is selected from the group consisting of diatomaceous earths, talcs, amorphous and fumed silicas, inorganic metal salts, polyoxyethylene fatty alcohols, wollastonites, glass particles, perlites, mica, titanates, hydrated alumina, various forms of carbon, fluoroplastics, polyvinyl alcohols, polysiloxanes, clays and silicates.

3. The package of claim 1, wherein the slip agent is a fatty acid selected from the group consisting of behenic acid, stearic acid and arachidic acid.

4. The package of claim 1, wherein the slip agent is a fatty acid amide selected from the group consisting of oleamide, erucamide, stearamide and ethylene bisoleamide.

5. The package of claim 1, wherein the slip agent is zinc stearate.

6. The package of claim 1, wherein the slip agent is an approximately equal mixture of erucamide and stearamide.

7. The package of claim 6, wherein the antiblock agent is diatomaceous earth or talc.

8. The package of claim 7, wherein the syndiotactic 1,2-polybutadiene contains about 3 to 7% by weight of diatomaceous earth or about 4 to 6% by weight of talc as the antiblock agent and about 1 to 2% by weight of said mixture of erucamide and stearamide as the slip agent.

9. The package of claim 1, wherein the packaged article is at least one compounding ingredient for unvulcanized rubber.

10. The package of claim 9, wherein the compounding ingredients are selected from at least one of clay, silicates, calcium carbonate, cadmium diethyldithiocarbamate, tetramethylthiuram disulfide, benzothiazyl disulfide, substituted thio esters and amine type antioxidants; aniline antiozonant derivatives; diamine and/or thiourea curing agents selected from sulfur, sulfur providing compounds and peroxides; ultraviolet agents selected from substituted benzotriazoles and substituted benzophenones; coloring pigments selected from iron oxide, titanium dioxides and organic dyes; reinforcing pigments selected from carbon black, zinc oxide and hydrated silicon compounds; silicon dioxide; and a minor amount of a rubber processing oil when mixed with at least one of said compounding ingredients.

11. The package of claim 1, wherein the thickness of said bag or film is about 1 to 3 mils.

12. The package of claim 1, wherein said article is an unvulcanized rubber.

13. A compounded rubber comprised of a mixture of an unvulcanized rubber and a package comprising at least one compounding ingredient for unvulcanized rubber packaged in a bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the thickness of said bag or film being in the range of about 0.5 to about 10 mils.

14. The compounded rubber of claim 13, wherein the unvulcanized rubber is at least one member selected from the group consisting of natural rubber, synthetic cis-1,4-polyisoprene, polybutadiene, rubbery copolymers of 1,3-butadiene and styrene, rubbery copolymers of butadiene and acrylonitrile, butyl rubber, rubbery copolymers of ethylene and propylene and rubbery terpolymers of ethylene, propylene and a copolymerizable diene.

15. The sulfur or peroxide cured compounded rubber of claim 14.

16. The sulfur or peroxide cured compounded rubber of claim 13.

17. A packaged unvulcanized rubber which comprises said unvulcanized rubber substantially encompassed with a wrap or bag of a protective film having a thickness in the range of about 0.5 to about 10 mils, said film being made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof.

18. The package of claim 17, wherein the antiblock agent is selected from the group consisting of diatomaceous earths, talcs, amorphous and fumed silicas, inorganic metal salts, polyoxyethylene fatty alcohols, wollastonites, glass particles, perlites, mica, titanates, hydrated alumina, various forms of carbon, fluoroplastics, polyvinyl alcohols, polysiloxanes, clays and silicates.

19. A method of compounding rubber which comprises mixing unvulcanized rubber with a package comprising at least one compounding ingredient for unvulcanized rubber packaged in a coextruded bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the total thickness of said bag or film being in the range of about 0.5 to about 10 mils, said coextruded bag or film comprising at least an inside layer and an outside layer, said inside layer being comprised of syndiotactic 1,2-polybutadiene containing a greater amount of one or more of said antiblock agents than the outside layer.

20. The method of claim 19, wherein the unvulcanized rubber is contained in a wrap or bag of a protective film having a thickness in the range of about 0.5 to about 10 mils, said film being made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, said coextruded bag or film comprising at least an inside layer and an outside layer, said inside layer being comprised of syndiotactic 1,2-polybutadiene containing a greater amount of one or more of said antiblock agents than the outside layer.

21. A package which comprises (A) an article selected from at least one of unvulcanized or vulcanized rubber or compounding ingredients for unvulcanized rubber packaged in (B) a coextruded bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the total thickness of said bag or film being in the range of about 0.5 to about 10 mils, said coextruded bag or film comprising at least an inside layer and an outside layer, said inside layer being comprised of syndiotactic 1,2-polybutadiene containing a greater amount of one or more of said antiblock agents than the outside layer.

22. The package of claim 21, wherein the antiblock agent is selected from the group consisting of diatomaceous earths, talcs, amorphous and fumed silicas, inorganic metal salts, polyoxyethylene fatty alcohols, wollastonites, glass particles, perlites, mica, titanates, hydrated alumina, various forms of carbon, fluoroplastics, polyvinyl alcohols, polysiloxanes, clays and silicates.

23. The package of claim 21, wherein the inside layer of the coextruded bag or film contains about 3 to 8% by weight of antiblock agent and about 0.5 to 3% by weight of slip agent and the outside layer thereof contains about 0.5 to 3% by weight of slip agent and about 1 to 4% by weight of antiblock agent.

24. The package of claim 21, wherein the inside layer of the coextruded bag or film contains about 4 to 7% by weight of antiblock agent and about 1 to 2% by weight of slip agent and the outside layer thereof contains about 1 to 2% by weight of slip agent and about 1 to 3% by weight of antiblock agent.

25. The package of claim 21, wherein said inside layer comprises about 10 to 40% and said outside layer comprises about 60 to 90% of the total thickness of said bag or film.

26. The package of claim 21, wherein the slip agent is a fatty acid selected from the group consisting of behenic acid, stearic acid and arachidic acid.

27. The package of claim 21, wherein the slip agent is a fatty acid amide selected from the group consisting of oleamide, erucamide, stearamide and ethylene bisoleamide.

28. The package of claim 21, wherein the slip agent is zinc stearate.

29. The package of claim 21, wherein the slip agent is an approximately equal mixture of erucamide and stearamide.

30. The package of claim 29, wherein the antiblock agent is diatomaceous earth or talc.

31. The package of claim 30, wherein said inside layer contains about 3 to 8% by weight of antiblock agent and about 0.5 to 3% by weight of slip agent and the outside layer thereof contains about 0.5 to 3% by weight of slip agent and about 1 to 4% by weight of antiblock agent.

32. The package of claim 30, wherein said inside layer contains about 4 to 7% by weight of antiblock agent and about 1 to 2% by weight of slip agent and the outside layer thereof contains about 1 to 2% by weight of slip agent and about 1 to 3% by weight of antiblock agent.

33. The package of claim 21, wherein the packaged article is at least one compounding ingredient for unvulcanized rubber.

34. The package of claim 33, wherein the compounding ingredients are selected from at least one of clay, silicates, calcium carbonate, cadmium diethyldithiocarbamate, tetramethylthiuram disulfide, benzothiazyl disulfide, substituted thio esters and amine type antioxidants; aniline antiozonant derivatives; diamine and/or thiourea curing agents selected from sulfur, sulfur providing compounds and peroxides; ultraviolet agents selected from substituted benzotriazoles and substituted benzophenones; coloring pigments selected from iron oxide, titanium dioxides and organic dyes; reinforcing pigments selected from carbon black, zinc oxide and hydrated silicon compounds; silica dioxide; and a minor amount of a rubber processing oil when mixed with at least one of said compounding ingredients.

35. The package of claim 21, wherein the thickness of said bag or film is about 1 to 3 mils.

36. The package of claim 21, wherein said article is an unvulcanized rubber.

37. A compounded rubber comprised of a mixture of an unvulcanized rubber and a package comprising at least one compounding ingredient for unvulcanized rubber packaged in a coextruded bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the total thickness of said bag or film being in the range of about 0.5 to about 10 mils, said coextruded bag or film comprising at least an inside layer and an outside layer, said inside layer being comprised of syndiotactic 1,2-polybutadiene containing a greater amount of one or more of said antiblock agents than the outside layer.

38. The compounded rubber of claim 37, wherein the unsaturated rubber is at least one member selected from the group consisting of natural rubber, synthetic cis-1,4-polyisoprene, polybutadiene, rubbery copolymers of 1,3-butadiene and styrene, rubbery copolymers of butadiene and acrylonitrile, butyl rubber, rubbery copolymers of ethylene and propylene and rubbery terpolymers of ethylene, propylene and a copolymerizable diene.

39. A packaged unvulcanized rubber which comprises said unvulcanized rubber substantially encompassed with a wrap or bag of a protective film having a thickness in the range of about 0.5 to about 10 mils, said film being made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, said coextruded bag or film comprising at least an inside layer and an outside layer, said inside layer being comprised of syndiotactic 1,2-polybutadiene containing a greater amount of one or more of said antiblock agents than the outside layer.

40. The package of claim 39, wherein the antiblock agent is selected from the group consisting of diatomaceous earths, talcs, amorphous and fumed silicas, inorganic metal salts, polyoxyethylene fatty alcohols, wollastonites, glass particles, perlites, mica, titanates, hydrated alumina, various forms of carbon, fluoroplastics, polyvinyl alcohols, polysiloxanes, clays and silicates.

41. A method of compounding rubber which comprises mixing unvulcanized rubber with a package comprising at least one compounding ingredient for unvulcanized rubber packaged in a bag or film made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof, the thickness of said bag or film being in the range of about 0.5 to about 10 mils.

42. The method of claim 41, wherein the unvulcanized rubber is contained in a wrap or bag of a protective film having a thickness in the range of about 0.5 to about 10 mils, said film being made of syndiotactic 1,2-polybutadiene containing at least one antiblock agent additive and also containing at least one slip agent additive selected from the group consisting of fatty acids and metal salts thereof, fatty acid amides, and ester waxes and partially saponified products thereof.

* * * * *